United States Patent [19]

Chou

[11] Patent Number: 5,126,401

[45] Date of Patent: * Jun. 30, 1992

[54] BLENDS OF ETHYLENE VINYL ALCOHOL COPOLYMER AND POLYAMIDES, AND MULTILAYER CONTAINERS MADE THEREFROM

[75] Inventor: Richard T. Chou, Wilmington, Del.

[73] Assignee: E. I. Du Pont de Nemours and Company, Wilmington, Del.

[*] Notice: The portion of the term of this patent subsequent to Jun. 30, 2009 has been disclaimed.

[21] Appl. No.: 554,776

[22] Filed: Jul. 19, 1990

Related U.S. Application Data

[63] Continuation-in-part of Ser. No. 301.473, Jan. 26, 1989, Pat. No. 4,990,562, which is a continuation-in-part of Ser. No. 88,261, Aug. 24, 1987, abandoned.

[51] Int. Cl.⁵ .................. C08F 16/06; C08F 116/06; C08F 216/06
[52] U.S. Cl. ........................................ 525/58; 525/56; 525/933; 525/60
[58] Field of Search .............. 525/58, 933, 56, 60

[56] References Cited

U.S. PATENT DOCUMENTS

| | | |
|---|---|---|
| 3,726.945 | 4/1973 | Bottenbruch et al. |
| 4,079,850 | 3/1978 | Suzuki et al. |
| 4,427,825 | 1/1984 | Degrassi et al. |
| 4,500,677 | 2/1985 | Maruhashi et al. |
| 4,826,955 | 5/1986 | Akkapeddi et al. ............ 528/324 |
| 4,908,272 | 1/1990 | Harada et al. ............ 528/339 |
| 4,952,628 | 8/1990 | Blatz ............ 525/58 |
| 4,990,562 | 2/1991 | Chou et al. ............ 525/60 |

FOREIGN PATENT DOCUMENTS

| | | |
|---|---|---|
| 0305146 | 8/1988 | European Pat. Off. |
| 0309095 | 8/1988 | European Pat. Off. |
| 53-49050 | 5/1978 | Japan |

OTHER PUBLICATIONS

07/301,473, Chou, Jan. 26, 1989.

Primary Examiner—James J. Siedleck
Assistant Examiner—William H. Clark

[57] ABSTRACT

A blenad consisting ethylene vinyl alcohol copolymer and a polyamide blend of an amorphous polyamide and a semicrystalline polyamide which is miscible with the amorphous polyamide but substantially immiscible with the vinyl alcohol copolymer exhibits good mechanical and barrier properties as well as good resistance to thermal degradation.

16 Claims, No Drawings

# BLENDS OF ETHYLENE VINYL ALCOHOL COPOLYMER AND POLYAMIDES, AND MULTILAYER CONTAINERS MADE THEREFROM

CROSS-REFERENCE TO RELATED APPLICATIONS

This is a continuation-in-part of copending U.S. application Ser. No. 07/301,473, filed Jan. 26, 1989, now U.S. Pat. No. 4,990,562, which in turn is a continuation-in-part of U.S. application Ser. No. 07/088,261, filed Aug. 24, 1987, now abandoned.

BACKGROUND OF THE INVENTION

This invention relates to blends of ethylene vinyl alcohol copolymer with an amorphous polyamide component and their use as a barrier layer in thermoformed multilayer containers and other applications.

Blends of ethylene vinyl alcohol polymers with polyamides in general are known, and have been used in packaging applications as barriers to inhibit the passage of atmospheric oxygen or other gases.

European patent application 0 305 146 discloses a blend of about 70 to about 95 percent by weight of an ethylene vinyl alcohol copolymer having a copolymerized ethylene content of about 20 to about 60 mole percent and a degree of saponification of at least about 90%, and about 5 to about 30 percent by weight of an amorphous polyamide. The composition is useful as a barrier layer in thermoformed containers.

European patent application 0 309 095 discloses a blend of about 50 to about 95 weight percent of an amorphous polyamide and about 5 to about 50 weight percent of a vinyl alcohol polymer having a copolymerized ethylene content of 0 to about 60 mol percent and a degree of saponification of at least about 90%. The blends have oxygen barrier properties which are relatively independent of humidity. Packaging films, laminates, and containers prepared therefrom are disclosed.

U.S. patent application Ser. No. 07/301.473 discloses a blend of ethylene vinyl alcohol copolymer and a polyamide blend of about 30 to about 90 percent by weight of at least one amorphous polyamide and about 10 to about 70 percent by weight of at least one semicrystalline polyamide which is miscible with the ethylene vinyl alcohol copolymer. The blends are useful for forming films, multiple layer structures, and formed structures prepared by stretching or thermoforming such multiple layer structures.

Japanese patent application 53-49050 discloses a blend of ethylene vinyl alcohol copolymer (EVOH) with 5 to 40 weight percent polyamide. The EVOH contains 20-50 mole percent copolymerized ethylene, and is saponified at least 90%. The polyamides disclosed include a copolymer of hexamethylene diamine with isophthalic and terephthalic acids, in mole ratios of 100/0 to 50/50. The blend is formed into a film, which possesses gas barrier properties. The barrier performance of the film is purported not to decline even in highly humid atmospheres.

U.S. Pat. No. 3,726,034 discloses mixtures of 70-99% polyamide and up to 30% of a hydroxyl containing polyolefin. The polyamides "consist of linear unbranched polymer chains containing no additional functional groups." Exemplified are blends of nylon 6 and EVOH.

U.S. Pat. No. 4,079,850 discloses a multilayer blow molded container, which contains a layer which may be EVOH, polyamide, or various blends, providing gas barrier properties. The polyamides which are mentioned are nylon 6, nylon 66, and nylon 12.

U.S. Pat. No. 4,427,825 discloses a composition of matter useful for making films, of polyamide and 1–65% EVOH. Nylons with melting points greater than 175° C. are preferred, such as nylon 11 or nylon 12.

U.S. Pat. No. 4,500,677 discloses a resin composition comprising a mixture of two EVOH resins and a polyamide resin. The ratio of the EVOH resins to the nylon resin can be between 95:5 and 5:95. Nylon 6, nylon 6,6 and other polyamides having "linear alkylene group[s]" are specifically mentioned.

Ethylene vinyl alcohol copolymer (EVOH) is commonly used in the form of a thin layer together with thicker layers of less expensive structural materials, for example, polypropylene or polyethylene terephthalate, in order to form a structure which is resistant to the passage of atmospheric oxygen or other gasses. In order to make containers or oriented films of such multilayer structures a solid phase thermoforming process is often used. However, EVOH cannot be formed at the relatively lower temperatures required for the thermoforming of many common structural materials without rupturing the EVOH layer, resulting in a loss of overall barrier performance. The present invention provides a modified EVOH composition which may be used in thermoformed multilayer structures to avoid the above mentioned problems, and without substantially sacrificing the excellent gas barrier properties of EVOH. It may also be used in other applications where stretching is required during the processing of the article, such as in shrink films.

BRIEF SUMMARY OF THE INVENTION

The present invention provides a blend consisting essentially of about 5 to about 95 percent by weight of an ethylene vinyl alcohol copolymer having a copolymerized ethylene content of about 20 to about 60 mole percent and a degree of saponification of at least about 90%, and about 95 to about 5 percent by weight of a polyamide blend consisting essentially of about 35 to about 95 percent by weight of at least one amorphous polyamide having a glass transition temperature of up to about 160° C. and about 5 to about 65 percent by weight of at least one semicrystalline polyamide which has a methylene group/amide group ratio of about 5.5 to about 7.5 and which forms separate domains when blended with said ethylene vinyl alcohol copolymer. The present invention also provides films prepared of such blends, multiple layer structures including a layer of such blend, and formed structures prepared by stretching or thermoforming such multiple layer structures. The invention also includes oriented multilayer shrink films which include at least one layer of such blends.

DETAILED DESCRIPTION OF THE INVENTION

Materials and structures with barrier properties are important in many applications. Of particular interest are packaging materials which are barriers to the penetration of gases, such as oxygen, carbon dioxide, and various aromas.

In many packaging applications EVOH resins are used as relatively thin components of multilayer structures or containers. Usually the major parts of the structures are made of less expensive "structural" materials, bound to the EVOH layer by adhesive layers. The fabrication process in converting multilayer structures into final products often involves a mechanical deformation operation, such as orientation, thermoforming, or stretching in general, depending on the final form of the desired structure. However, EVOH generally exhibits very poor drawability, that is, the ability to be stretched or deformed uniformly at a temperature below its melting point. Quite often the stretching or deformation operation induces cracks, discontinuity or thinning ("neckdown") in the EVOH layer. As a result stretched or deformed multilayer structures which include a layer of EVOH resin often exhibit inferior barrier properties.

For the purposes of this invention, a deformation process includes any process for forming a shaped article (e.g., a film or a container) which (a) is distinct from the initial melt processing step and (b) which is performed at a temperature which is elevated above room temperature but lower than the melting point of the polymeric structural material. Casting of a film would not be a deformation process according to this definition because it is a melt processing step; vacuum-forming a film to prepare a container would be a deformation process. Making a film by a blown tubular process may or may not be a deformation process, depending on the temperature of the tubing or bubble at the location where blowing occurs. Examples of deformation processes include thermoforming (but excluding melt phase thermoforming), vacuum-forming, solid phase pressure forming, co-injection blow molding, co-injection stretch blow molding, tube extrusion followed by stretching, scrapless forming, forging, and tubular or flat sheet oriented film processes. Examples of articles that can be prepared using deformation processes are films and containers such as bottles, jars, cans, bowls, trays, dishes, pouches, oriented films, and shrink films. Deformation of polymeric materials is not only a way to attain such final shaped articles, but may also be a means to enhance barrier properties, mechanical properties, or even optical properties.

The temperature of the deformation step is usually determined by the "forming temperature" of the structural material, that is, the temperature at which it can be deformed. The forming temperature of a polymer is not readily related to any material properties of the polymer, except that it is normally higher than the Tg of the polymer. In addition, this temperature is affected by the magnitude and rate of deformation of the particular process employed. The forming temperature of a given material for a given process can be readily determined by a person skilled in the art with a minimum of experimentation. Many structural materials have a lower forming temperature than that of EVOH, and it may be desirable for many reasons to conduct a molding operation at as low a temperature as possible. Furthermore, it may be desirable to reach an extent of deformation as high as possible. Thus the temperatures used for the deformation of such multilayer structures may be so low or the extent of deformation may be so high that the drawability of the EVOH layer is exceeded. As a consequence the desired deformed articles cannot be made without tearing or rupturing of the EVOH layer. The resulting discontinuities in the EVOH layer result in inferior oxygen barrier performance of the resulting article. An object of this invention is to provide a modified EVOH composition which may be used in deformed multilayer structures to avoid the above mentioned problems, and without substantially sacrificing the excellent gas barrier properties of EVOH. This modified composition is a blend of EVOH with an amorphous polyamide and a semicrystalline polyamide.

The first component of the composition of the present invention is an ethylene vinyl alcohol copolymer. The EVOH resins useful in this invention include resins having a copolymerized ethylene content of about 20 to about 60 mole %, especially about 25 to about 50 mole %. Copolymers of lower than about 15 to 20 mole % ethylene tend to be difficult to extrude while those above about 60 or 65 mole % ethylene have reduced oxygen barrier performance. These polymers will have a saponification degree of at least about 90%, especially at least about 95%. A degree of saponification of less than about 90% results in inferior oxygen barrier properties. The ethylene vinyl alcohol copolymer may include as an optional comonomer other olefins such as propylene, butene-1, pentene-1, or 4-methylpentene-1 in such an amount as to not change the inherent properties of the copolymer, that is, usually in an amount of up to about 5 mole % based on the total copolymer. The melting points of these ethylene vinyl alcohol polymers are generally between about 160° and 190° C.

Ethylene vinyl alcohol polymers are normally prepared by copolymerization of ethylene with vinyl acetate, followed by hydrolysis of the vinyl acetate component to give the vinyl alcohol group. This process is well known in the art.

The second component of the present invention is a polyamide component. The polyamide component comprises about 5 to about 95 percent by weight of the total composition of EVOH plus polyamide, preferably about 15 to about 70 percent, and most preferably about 15 to about 30 percent. The polyamide component is itself a blend of amorphous polyamide with semicrystalline polyamide. In particular, blends of about 35 to about 95 percent of at least one amorphous polyamide with 5 to 65 percent by weight of at least one semicrystalline polyamide are suitable, and blends in which the amorphous polyamide comprise about 50 to about 80 percent by weight of the polyamide component are preferred.

The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute.

Examples of the amorphous polyamides that can be used include those amorphous polymers prepared from the following diamines: hexamethylenediamine, 2-methylpentamethylenediamine, 2,2,4-trimethylhexamethylenediamine, 2,4,4-trimethylhexamethylenediamine, bis(4-aminocyclohexyl)methane, 2,2-bis(4-aminocyclohexyl)isopropylidine, 1,4-diaminocyclohexane, 1,3-diaminocyclohexane, meta-xylylenediamine, 1,5-diaminopentane, 1,4-diaminobutane, 1,3-diaminopropane, 2-ethyldiaminobutane, 1,4-diaminomethylcyclohexane, p-xylylenediamine, m-phenylenediamine, p-phenylenediamine, and alkyl substituted m-phenylenediamine and p-phenylenediamine.

Examples of polyamides that can be used include those amorphous polymers prepared from the following dicarboxylic acids: isophthalic acid, terephthalic acid, alkyl substituted iso- and terephthalic acid, adipic acid, sebacic acid, butane dicarboxylic acid, and the like.

Polyamides prepared from aliphatic diamines with aliphatic diacids are the traditional semicrystalline nylons (also referred to as crystalline nylons) and are not amorphous polyamides. Polyamides prepared from aromatic diamines and aromatic diacids are also known. However, certain of these all-aromatic polyamides are known to be intractable under ordinary melt processing conditions, and thus are not normally suitable. Thus the preferred amorphous polyamides are those in which either the diamine or the diacid moiety is aromatic, and the other moiety is aliphatic. The aliphatic groups of these polyamides preferably contain 4–8 carbon atoms in a chain or an aliphatic cyclic ring system having up to 15 carbon atoms. The aromatic groups of the polyamides preferably have mono or bicyclic aromatic rings which may contain aliphatic substituents of up to about 6 carbon atoms.

Specific examples of amorphous polyamides which are suitable for this invention include: hexamethylenediamine isophthalamide, hexamethylenediamine isophthalamide/terephthalamide terpolymer, having iso-/terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso- or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

The above amorphous polyamides may contain as comonomers minor amounts of lactam species such as caprolactam or lauryl lactam, even though polymers based on these monomers alone are not amorphous. The important feature is that the polyamide as a whole must be amorphous. Thus small amounts of these comonomers may be incorporated as long as they do not impart crystallinity to the polyamide. In addition, up to about 10 weight % of a liquid or solid plasticizer such as glycerol, sorbitol, mannitol, or aromatic sulfonamide compounds (such as "Santicizer 8" from Monsanto) may be included with the amorphous polyamide.

For most applications the Tg of the amorphous polyamide (as measured in the dry state, i.e., containing about 0.12 weight % moisture or less) should be in the range of about 60° C. to about 160° C., and preferably about 80° C. to about 130° C. Certain unblended amorphous polyamides, as described above, have Tgs of around 125° C. when dry. The lower limit on Tg is not clearly demarked and is not believed to be critical; 60° C. is an approximate lower limit. The upper limit on the Tg is likewise not clearly demarked. But amorphous polyamides with Tg above about 160° C. are not readily thermoformable when used as a barrier layer. Thus all-aromatic polyamides, having aromatic groups in both acid and amine moieties, tend to have a Tg which is too high to permit thermoforming, and are thus normally unsuitable for the purposes of this invention.

The polyamide component also includes at least one selected semicrystalline polyamide. The term "semicrystalline polyamide" refers to the traditional semicrystalline nylons, which are generally prepared from lactams or amino acids or from condensation of diamines such as hexamethylene diamine with dibasic acids, such as sebacic acids. Copolymers and terpolymers of these polyamides are also included, as are blends of two or more semicrystalline polyamides. The polyamides of the present invention, both semicrystalline and amorphous, are prepared by condensation polymerization or anhydrous polymerization, which are well known to those skilled in the art.

However, not all semicrystalline nylons are suitable for the present invention. The suitable nylons are those which have a methylene group/amide group ratio in the range of about 5.5 to about 7.5, preferably about 5.7 to about 6.7. This ratio is defined as the ratio of methylene ($CH_2$) groups to amide (CONH) groups in the polymer. For example, a polyamide prepared from caprolactam (nylon 6) has monomer units of $-(CH_2)_5CONH-$, thus having 5 methylene groups for each amide group and a ratio of 5 ($=n-1$, where n is the number of carbon atoms). In a polyamide formed from condensation of a diacid and a diamine, the ratio is calculated as $(n+m-2)/2$, where n and m are the number of carbon atoms in the diacid and diamine moieties. Thus for nylon 610 the ratio is 7. Examples of suitable semicrystalline nylons include nylon 69, nylon 610, copolymers of caprolactam and laurolactam with comonomer weight ratios of 85/15 to 45/55, copolymers of nylon 6 and nylon 69 with weight ratio range 50/50 to 0/100, copolymers of nylon 66 and nylon 610 with weight ratio range 70/30 to 0/100, and other combinations of copolymers or terpolymers. Blends containing semicrystalline nylons which have a methylene/amide ratio of less than about 5.5 do not exhibit the desired thermal stability; those with semicrystalline nylons having a ratio of greater than about 7.5 have poorer thermoforming properties.

The blends of the present invention comprise about 5 to about 95 percent by weight EVOH and about 95 to about 5 percent by weight of the polyamide blend described above. When less than about 5% of the polyamide blend is used, the improvements in formability imparted by the invention are not fully realized. When more than about 95% of the polyamide blend is used the oxygen barrier properties of the blend are degraded. And when the polyamide blend itself comprises more than about 65% semicrystalline polyamide, the oxygen barrier properties and processability are reduced. Preferably such blends will contain about 30 to about 85 weight % EVOH and about 70 to about 15% weight percent polyamide blend component. Of course, small amounts of other material such as other polymers, processing aids, antioxidants, fillers, pigments, etc. may be included in the blend without destroying the essence of this invention.

The blends of the present invention may be prepared by blending techniques well known in the art, including the use of single or twin screw melt processors or extruders. Blending is performed at temperatures sufficiently high to form a uniform melt of the components to be blended, typically about 200° to about 225° C., above the melting points of the two components. The blends of the present invention may be prepared by blending EVOH and a preblended mixture of amorphous polyamide and semicrystalline polyamide. Alternatively, they may be prepared by blending the three components simultaneously. The former procedure is preferred for reducing the processing temperature when the semicrystalline polyamide has a high melting point, i.e., higher than about 225° C. and for attaining superior thermal stability.

The blends of the present invention may be formed into a film, which may be done by typical equipment such as extrusion casting or blown film lines, which may be uniaxially or biaxially oriented, if desired, by known techniques.

In addition, multiple layer structures which contain one or more layers of the blend of the present invention may be prepared. These structures may be incorporated into containers, which take advantage of the oxygen barrier properties of the blend of the present invention. In making multilayer containers, a structural layer will often be used, to provide structural support for the blend layer. The materials used for the structural layers may be made, for example, from any of a variety of structural polymers. Examples of such structural polymers include polyolefins such as polybutylene, polypropylene (either homopolymers or copolymers with ethylene), polyethylene homopolymer or co- or terpolymers of ethylene with other monomers such as vinyl acetate, carboxylic acids, such as acrylic acid, or methacrylic acid (with or without neutralization to form ionomers), polyethylene terephthalate or its copolymers, and polymers based on vinyl chloride or styrene, and the like.

The various layers of such multiple layer structures may be held together by any of a variety of adhesive resins. In general, such adhesive resins are thermoplastic polymers having carbonyl groups derived from functional groups of free carboxylic acids, carboxylic acid salts, carboxylic acid esters, carboxylic acid amides, carboxylic anhydrides, carbonic acid esters, urethanes, ureas or the like. In these thermoplastic polymers, the carbonyl group concentration may be changed in a broad range, but in general, it is preferred to use a thermoplastic polymer containing carbonyl groups at a concentration of 10 to 1400 millimoles per 100 g of the polymer. Suitable adhesive resins include polyolefins modified with at least one ethylenically unsaturated monomer selected from unsaturated carboxylic acids and anhydrides, esters and amides thereof, especially polypropylene, high density polyethylene, low density polyethylene and ethylene-vinyl acetate copolymers modified with at least one member selected from acrylic acid, methacrylic acid, crotonic acid, fumaric acid, itaconic acid, maleic anhydride, itaconic anhydride, citraconic anhydride, ethyl acrylate, methyl methacrylate, ethyl maleate, 2-ethylhexyl acrylate, acrylamide, methacrylamide, fatty acid amides, and imides of the acids described above. The adhesive can also be prepared from an ethylene polymer and a second polymer grafted with maleic anhydride, as disclosed in U.S. Pat. No. 4,230,830, the disclosure of which is incorporated herein by reference. In addition, as the adhesive resin, there can be used ethylene-acrylate copolymers, ionomers, polyalkylene oxide-polyester block copolymers, carboxymethyl cellulose derivatives, and blends of these polymers with polyolefins.

It has been discovered that the blends of this invention can be used to make films and multiple layer structures which not only have excellent oxygen barrier properties, but also exhibit superior deformation characteristics. These structures can be deformed, stretched into biaxially oriented film, or thermoformed into shaped containers without occurrence of breaks or discontinuities in the EVOH blend layer, in contrast to the behavior of multilayer structures involving either EVOH by itself, or EVOH blended with crystalline polyamides. These structures, furthermore, can achieve a high degree of deformation, orientation, thermoforming, or stretching in any form, in a broad temperature range, in contrast to the behavior of either EVOH alone, EVOH blended with crystalline polyamide, or even EVOH blended with amorphous polyamide. Furthermore, the thermal stability of the present blends is dramatically improved compared with similar compositions either without the amorphous polyamide or in which the selected semicrystalline polyamide is replaced by another polyamide.

While not wishing to be bound by any particular theory, it is believed that certain of the improvements of the present invention can be partially understood by considering the microscopic structure of blends of EVOH with polyamides. Electron microscopy shows that blends of EVOH and the present mixture of polyamides form at least a two-phase system. The heterogeneous structure of such blends is important to attain good deformation capability and barrier properties. In contrast, blends of EVOH and semicrystalline nylon with $CH_2/CONH$ ratio of less than about 5.5 appear to be microscopically miscible and it is difficult to separately distinguish the components microscopically. It is believed that under melt processing conditions the diffusion of such miscible semicrystalline nylons into the EVOH leads to thermal stability problems. Use of polyamides with $CH_2/CONH$ ratios of the present invention greatly avoids this problem because of reduced or lack of miscibility of the nylon with EVOH. At the lower end of the range of the present invention, i.e. ratios of 5.5 to about 6, blends of the nylon with EVOH begin to show phase separation and distinct nylon domains. For example, a blend made under good mixing conditions with a nylon having a ratio of 5.7 exhibits nylon domains about 0.1 to 0.2 micrometers in diameter. At higher ratios, a clear two-phase system results. For example, blends of nylon 69 (ratio 6.5) or nylon 610 (ratio 7.0) with EVOH clearly exhibit two-phase systems indicating substantial immiscibility. When the $CH_2/CONH$ ratio significantly exceeds about 7.5, however, the nylon is generally ineffective in attaining the objectives of the present invention.

EXAMPLES

Examples 1–8 and Comparative Examples C1–C7

These examples illustrate the superior thermal stability of compositions of the present invention. Blends were made from an ethylene vinyl alcohol copolymer, an amorphous polyamide, and a semicrystalline nylon, as indicated in Table I. In this Table, APA1 is an amorphous polyamide prepared by the condensation of hexamethylenediamine with 70% isophthalic acid and 30% terephthalic acid, having a melt flow index (230° C.) of 3.5 dg/min and an inherent viscosity of 0.82. APA2 is an amorphous polyamide prepared by the condensation of hexamethylenediamine with 70% isophthalic acid and 30% terephthalic acid, having a melt flow index (230° C.) of 4.1 dg/min and an inherent viscosity of 0.76.

After blending, the thermal stability of the compositions was evaluated by subjecting the samples to Haake mixing. In a typical run, a sample of 50 grams was mixed in a Haake mixer (Haake Buchler Instruments, Inc., Rheocord ™ System 40), at 230° C. for 30 minutes and 50 r.p.m. The melt flow index (in dg/min, run at 230° C. after a 5 minute heating time) and the gel content of the sample after Haake treatment are reported in Table I.

For measurement of gel content, the samples were dissolved in a hot water/isopropanol mixture (50:50%) and filtered through a 200 mesh (0.074 mm) screen to retain undissolved gel. The results in Table I show that the compositions of the present invention exhibit much improved thermal stability compared with examples in which the amorphous polyamide is eliminated or in which the semicrystalline nylon has a methylene/amide ratio of less than about 5.5. (Comparative Examples C4 and C5 have a ratio greater than 7.5; they exhibit adequate stability but poorer orientation properties, as will be seen in Table II.)

TABLE I

| Ex. | Composition[a] | $CH_2$:CONH | Melt Index after Haake | Gel, % |
|---|---|---|---|---|
| 1 | EVOH1/APA2/Nylon 610 (80/12/8%) | 7.0 | 1.60 | 0.40 |
| 2 | EVOH1/APA1/Nylon 66, 610 (80/12/8%) | 6.8 | 1.00 | 0.74 |
| 3 | EVOH1/APA1/Nylon 69 (80/12/8%) | 6.5 | 2.17 | 0.16 |
| 4[b] | EVOH1/APA1/Nylon 69 (80/12/8%) | 6.5 | 1.94 | 0.27 |
| 5 | EVOH1/APA1/Nylon 69 (25/45/30%) | 6.5 | 3.4 | [c] |
| 6 | EVOH2/APA1/Nylon 6, 12(a) (80/14/6%) | 5.7 | 8.85 | 0.74 |
| 7 | EVOH1/APA1/Nylon 6, 12(a) (80/12/8%) | 5.7 | 1.30 | 1.00 |
| 8 | EVOH1/APA1/Nylon 6, 69 (80/12/8%) | 5.5 | 1.30 | 1.02 |
| C1 | EVOH1 (100%) | — | 2.10 | 0.23 |
| C2 | EVOH1/APA1/Nylon 6 (80/14/6%) | 5.0 | 0.47 | >10 |
| C3 | EVOH1/APA1/Nylon 6, 66 (80/14/6%) | 5.0 | 0.42 | >10 |
| C4 | EVOH2/APA1/Nylon 6, 12(b) (80/14/6%) | 7.8 | 12.44 | 0.96 |
| C5 | EVOH1/APA1/Nylon 612 (80/12/8%) | 8.0 | 1.33 | 0.40 |
| C6 | EVOH1/Nylon 6, 12(a) (80/20%) | 5.7 | 0.15 | [c] |
| C7 | EVOH2/Nylon 6 | 5.0 | 0.58 | [c] |

[a]Compositions were prepared by blending the two polyamides and subsequently blending with the EVOH, except as noted.
EVOH1 is a copolymer containing 30 mole % ethylene, melt flow 3 dg/min at 210° C, melting point 184° C., >99% saponified.
EVOH2 is a copolymer containing 44 mole % ethylene, melt flow 12 dg/min at 210° C., >99% saponified.
Nylon 66, 610 is a copolymer with 90 parts nylon 610 and 10 parts nylon 66.
Nylon 6, 12(a) is a copolymer of 80 parts caprolactam and 20 parts laurolactam, melting point about 195° C.
Nylon 6, 12(b) is a copolymer of 40 parts caprolactam and 60 parts laurolactam, melting point about 130° C.
[b]Three components mixed simultaneously.
[c]Measurement not made.

Examples 9-18 and Comparative Examples C8-C11

Multilayer coextruded structures were prepared using certain of the compositions from Table I or other compositions as indicated as a barrier layer along with a structural layer as defined in Table II. Three single screw extruders, a combining adapter, and a 35 cm wide single manifold sheeting die were used. The two symmetrically arranged surface layers, each 0.2 to 0.3 mm thick, were extruded on a 38 mm single screw extruder. L/D=24. Two symmetrically arranged adhesive layers, each 0.02 to 0.04 mm thick, were extruded using a 32 mm single screw extruder, L/D=24. The sample core layers were extruded on a 25 mm single screw extruder, L/D=24, equipped with a grooved feed section. The thicknesses of the barrier layer and the overall sheet before and after stretching are reported in Table II (presented in the format barrier thickness/overall thickness).

Thereafter the multilayer structures were biaxially oriented with a film stretcher (manufactured by T.M. Long Co.) under the conditions indicated in Table II. The drawing was simultaneous in the machine and transverse directions, except where indicated, at a rate of 4000%/minute. The oxygen transmission rate (in mL/m²-24 hours-atmosphere at 30° C.) of the oriented film was measured at a given moisture condition according to ASTM D-3985. The quality of the oriented film was also visually evaluated and rated on a scale of A-D, where A indicates a uniformly drawn film with extremely high transparency, B indicates uniform drawing, but slight haze, C indicates noticeable irregularity with neckdown in barrier layer, and D indicates breakdown in the core layer and complete loss of barrier property.

TABLE II

| Ex. | Structure[a] Core | Adhes | Outer | Thick. (mm) | Orientation Condition | Film Qual | Thick (mm)[d] | OTR (@ % RH) |
|---|---|---|---|---|---|---|---|---|
| 9 | Ex. 6 | Adh1 | PP1 | .058/.53 | 4 × 4, 145° C. | B | .021 | 4.5 (78) |
|  |  |  |  |  | 4 × 4, 150° C. | B |  | [c] |
| 10 | Ex. 7 | Adh2 | EP1 | .061/.62 | 5 × 5, 130° C. | D |  | [c] |
|  |  |  |  |  | 5 × 5, 140° C. | A | .017 | 11.2 (80) |
| 11 | EVOH1/APA1/Nylon 6, 12 (a) (24/45/30) | Adh2 | EP1 | .061/.62 | 5 × 5, 140° C.[b] | A | .015 | 180 (80) |
|  |  |  |  |  | 5 × 5, 140° C. | A |  | [c] |
| 12 | Ex. 2 | Adh2 | EP1 | .048/.48 | 4 × 4, 130° C. | A | .018 | 8.2 (78) |
|  |  |  |  |  | 4 × 4, 140° C. | A |  | [c] |
| 13 | EVOH1/APA2/Nylon 6, 12(a) (80/14/6) | Adh2 | EP1 | .051/.51 | 4 × 4, 130° C. | B |  | [c] |
|  |  |  |  |  | 4 × 4, 140° C. | B | .019 | 11.9 (78) |
| 14 | Ex. 3 | Adh2 | EP1 | .051/.49 | 4 × 4, 130° C. | A |  | [c] |
|  |  |  |  |  | 4 × 4, 140° C. | A | .016 | 14.0 (78) |
| 15 | Ex. 3 | Adh3 | LLDPE | .081/.50 | 3 × 3, 110° C. | A | .030 | 5.1 (78) |
|  |  |  |  |  | 4 × 4, 110° C. | D |  | [c] |
| 16 | Ex. 5 | Adh3 | LLDPE | .061/.46 | 3 × 3, 110° C. | A | .042 | 212.4 (99) |
|  |  |  |  |  | 4 × 4, 110° C. | A |  | [c] |

TABLE II-continued

| Ex. | Structure[a] Core | Adhes | Outer | Thick. (mm) | Orientation Condition | Film Qual | Thick (mm)[d] | OTR (@ % RH) |
|---|---|---|---|---|---|---|---|---|
| 17 | Ex. 6 | Adh3 | LLDPE | .051/.48 | 3 × 3, 110° C. | A | .024 | 31.0 (78) |
|    |       |      |       |          | 3 × 3, 120° C. | D |      | c |
| 18 | EVOH1/APA1/ Nylon 6, 12(a) (50/30/20) | Adh4 | EVA | .061/.61 | 3 × 3, 110° C. | A | .057 | 10.1 (80) |
|    |       |      |       |          | 4 × 4, 110° C. | D |      | c |
| C8 | Ex C5 | Adh2 | EP1 | .051/.53 | 4 × 4, 130° C. | D |      | c |
|    |       |      |       |          | 4 × 4, 140° C. | D |      | c |
| C9 | Ex C4 | Adh2 | EP1 | .033/.43 | 4 × 4, 130° C. | C | .015 | 49.6 (80) |
|    |       |      |       |          | 4 × 4, 140° C. | C |      | c |
| C10 | EVOH1/ Nylon 610 (80/20) | Adh2 | EP1 | .056/.61 | 5 × 5, 130° C. | D |      | c |
|    |       |      |       |          | 5 × 5, 140° C. | D |      | c |
| C11 | EVOH1/ Nylon 6, 12(a) (80/20) | Adh3 | LLDPE | .061/.51 | 3 × 3, 110° C. | C |      | c |
|    |       |      |       |          | 3 × 3, 120° C. | D |      | c |

[a]Materials not previously defined are as follows:
PP1 = polypropylene, density 0.904, melt flow index 5 dg/min.
EP1 = copolymer of propylene and ethylene, melt flow index 2.0, density 0.90.
LLDPE = linear low density polyethylene, melt flow index 1.1, density 0.921.
EVA = ethylene vinyl acetate copolymer, melt flow index 2.0, melting point 97° C.
Adh1 = adhesive of a maleic anhydride grafted copolymer of propylene and ethylene, melt flow 2.6, melting point 149° C.
Adh2 = adhesive of a maleic anhydride grafted copolymer of propylene and ethylene, melt flow 6.8, melting point 136° C.
Adh3 = adhesive of a maleic anhydride grafted polyethylene, melt flow index 5.3, melting point 106° C.
Adh4 = adhesive of a maleic anhydride grafted copolymer of ethylene and vinyl acetate, melt flow index 2.0, melting point 80° C.
[b]Sequentially stretched.
[c]Not measured.
[d]Total thickness of film after stretching.

What is claimed is:

1. A blend consisting essentially of:
  (a) about 5 to about 95 percent by weight of an ethylene vinyl alcohol copolymer having a copolymerized ethylene content of about 20 to about 60 mole percent and a degree of saponification of at least about 90%, and
  (b) about 95 to about 5 percent by weight of a polyamide blend consisting essentially of
    (i) about 35 to about 95 percent by weight of at least one amorphous polyamide having a glass transition temperature of up to about 160° C. and
    (ii) about 5 to about 65 percent by weight of at least one semicrystalline polyamide which has a methylene group/amide group ratio in the range of about 5.5 to about 7.5 and which forms separate domains when blended with said ethylene vinyl alcohol copolymer.

2. The blend of claim 1 wherein the at least one semicrystalline polyamide has a methylene group/amide group ratio of about 5.7 to about 6.7.

3. The blend of claim 1 wherein the amorphous polyamide comprises about 50 to about 80 percent by weight of the polyamide blend.

4. The blend of claim 1 wherein the semicrystalline polyamide is selected from the group consisting of nylon 69, nylon 610, copolymers of caprolactam and laurolactam with comonomer weight ratios of about 85/15 to about 45/55, copolymers of nylon 6 and nylon 69 with weight ratios of about 50/50 to 0/100, and copolymers of nylon 66 and nylon 610 with weight ratios of about 70/30 to 0/100.

5. The blend of claim 1 wherein the ethylene vinyl alcohol copolymer is present at about 30 to about 85 percent by weight and the polyamide blend is present at about 15 to about 70 percent by weight.

6. The blend of claim 1 wherein the ethylene vinyl alcohol copolymer contains about 25 to about 50 mole percent copolymerized ethylene.

7. The blend of claim 6 wherein the ethylene vinyl alcohol copolymer has a degree of saponification of at least about 95 percent.

8. The blend of claim 1 wherein the amorphous polyamide has a glass transition temperature of about 80° to about 130° C.

9. The blend of claim 1 wherein the amorphous polyamide is selected from the group consisting of hexamethylenediamine isophthalamide, hexamethylenediamine isophthalamide/terephthalamide terpolymer, having isophthalic/terephthalic moiety ratios of 100/0 to 60/40, mixtures of 2,2,4- and 2,4,4-trimethylhexamethylenediamine terephthalamide, copolymers of hexamethylenediamine and 2-methylpentamethylenediamine with iso- or terephthalic acids, or mixtures of these acids.

10. The blend of claim 9 wherein the amorphous polyamide is hexamethylenediamine isophthalamide/-terephthalamide terpolymer, having an isophthalic/-terephthalic moiety ratio of about 70/30.

11. A film prepared from the blend of claim 1.
12. A film prepared from the blend of claim 2.
13. A film prepared from the blend of claim 3.
14. A film prepared from the blend of claim 5.
15. A film prepared from the blend of claim 9.
16. A multiple layer structure wherein at least one of the layers is prepared from the blend of claim 1.

* * * * *